(12) United States Patent
Li et al.

(10) Patent No.: US 10,518,307 B2
(45) Date of Patent: Dec. 31, 2019

(54) FILTER CLOTH RECOVERY DEVICE AND COPPER ROD CONTINUOUS CASTING AND ROLLING MANUFACTURING SYSTEM USING THE SAME

(71) Applicant: JCC Huabei (Tianjin) Copper Co., Ltd., Tianjin (CN)

(72) Inventors: Chuancang Li, Tianjin (CN); Fuqiang Li, Tianjin (CN)

(73) Assignee: JCC Huabei (Tianjin) Copper Co., Ltd., Tianjin (CN)

( * ) Notice: Subject to any disclaimer, the term of this patent is extended or adjusted under 35 U.S.C. 154(b) by 407 days.

(21) Appl. No.: 15/430,500

(22) Filed: Feb. 12, 2017

(65) Prior Publication Data

US 2018/0141096 A1 May 24, 2018

(30) Foreign Application Priority Data

Nov. 18, 2016 (CN) .......................... 2016 1 1020588

(51) Int. Cl.
| | |
|---|---|
| *B21B 1/46* | (2006.01) |
| *B01D 29/64* | (2006.01) |
| *B01D 29/68* | (2006.01) |
| *B01D 29/60* | (2006.01) |
| *B22D 11/12* | (2006.01) |

(52) U.S. Cl.
CPC ............ *B21B 1/463* (2013.01); *B01D 29/605* (2013.01); *B01D 29/6453* (2013.01); *B01D 29/6484* (2013.01); *B01D 29/684* (2013.01); *B22D 11/12* (2013.01)

(58) Field of Classification Search
None
See application file for complete search history.

(56) References Cited

U.S. PATENT DOCUMENTS

| | | |
|---|---|---|
| 2,904,981 A | 9/1959 | Macomson |
| 3,084,020 A | 4/1963 | Loosli |
| 3,098,370 A | 7/1963 | Poole et al. |
| 3,395,063 A | 7/1968 | Ralha |
| 3,496,698 A | 2/1970 | Wichmann |
| 3,577,214 A | 5/1971 | Levan et al. |
| 3,929,409 A | 12/1975 | Buchner et al. |
| 4,193,842 A | 3/1980 | Rushing |
| 4,302,485 A | 11/1981 | Last et al. |

(Continued)

FOREIGN PATENT DOCUMENTS

EP 0 808 928 A2 11/1997

*Primary Examiner* — Krishnan S Menon
(74) *Attorney, Agent, or Firm* — Suiter Swantz pc llo (57) ABSTRACT

Provided are a filter cloth recovery device and a copper rod continuous casting and rolling manufacturing system using the same. This device includes a cleaning water tank, a winding mechanism and a cleaning mechanism provided on the cleaning water tank. The winding mechanism includes: a winding shaft provided on the cleaning water tank for winding a filter cloth after being cleaned; a first guiding roller for guiding a filter cloth to be cleaned into a cloth-transmitting path within the cleaning water tank; and a second guiding roller between the first guiding roller and the winding shaft along the cloth-transmitting path for providing a tension force to the filter cloth. One end of the winding shaft is connected with a driving mechanism. The cleaning mechanism is provided with multiple liquid spraying openings for spraying a cleaning fluid to the filter cloth located in the cloth-transmitting path during winding.

14 Claims, 5 Drawing Sheets

(56) References Cited

U.S. PATENT DOCUMENTS

| | | |
|---|---|---|
| 4,707,260 A | 11/1987 | Nagayama |
| 4,727,734 A | 3/1988 | Kanazawa et al. |
| 4,818,244 A | 4/1989 | Iwami |
| 5,016,451 A | 5/1991 | Tsukabayashi et al. |
| 6,739,160 B1 | 5/2004 | Hiraga et al. |
| 7,074,337 B2 | 7/2006 | Miller |
| 7,201,777 B2 | 4/2007 | Booker, Jr. |
| 8,956,466 B2 | 2/2015 | Blaiss et al. |

FILTER CLOTH RECOVERY DEVICE AND COPPER ROD CONTINUOUS CASTING AND ROLLING MANUFACTURING SYSTEM USING THE SAME

CROSS REFERENCE TO RELATED APPLICATIONS

This application claims the benefit of Chinese national patent application 201611020588.2 filed Nov. 18, 2016. That application is entitled "Filter Cloth Recovery Device and Copper Rod Continuous Casting and Rolling Manufacturing System Using the Same," and is incorporated herein in its entirety by reference.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

BACKGROUND OF THE INVENTION

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

FIELD OF THE INVENTION

The present invention relates to the field of metal copper processing, and particularly to a filter cloth recovery device and a copper rod continuous casting and rolling manufacturing system using the same.

TECHNOLOGY IN THE FIELD OF THE INVENTION

In the process of fabricating a copper rod with a copper rod continuous casting and rolling manufacturing system, in order to ensure that the copper rod has a well-processed surface so as to guarantee its quality, it is usually necessary to supply an emulsion to a roll of a rolling mill. The emulsion is a kind of liquid prepared from an emulsifiable paste and softened water. The emulsion is used in the rolling mill to cool the copper rod and the roll, and also plays a role in lubricating the roll, and meanwhile has an effect of washing copper powders away from the surface of the copper rod, thereby prolonging the service life of the roller and guarantying the quality of the copper rod.

Since the emulsion is expensive, there is generally a need to recycle the emulsion during the manufacturing process. However, the emulsion after washing the copper rod carries copper powders, and if such emulsion is directly recycled without precipitation and filtration, the copper powders would impact a water pump when the water pump extracts the emulsion, which causes the service life of the water pump to be shortened, and furthermore, it fails to guarantee the quality of the manufactured copper rod. In order to better recycle the emulsion, an emulsion filtering machine is usually provided to filter and collect impurities from the emulsion.

The emulsion filtering machine usually uses a filter cloth to filter out the copper powders from the emulsion. As the copper powders accumulate on the surface of the filter cloth, they block up the filter cloth, which reduces the speed at which the emulsion passes through the filter cloth, and causes a liquid level above the filter cloth to rise. Once the liquid level above the filter cloth rises to a certain degree, a float switch provided above the filter cloth floats upward so that a controller connected with the float switch and a filter cloth moving motor of the emulsion filtering machine causes the moving motor to be powered on. Thus, the filter cloth moving motor starts up to drive a filter cloth moving roller to rotate, so as to transmit the filter cloth carrying the copper powders to the ground, until the filter cloth overlying the emulsion filtering machine can make the emulsion filtered smoothly. Then, the liquid level above the filter cloth decreases and the float switch falls off accordingly, causing the controller to power off the moving motor, and the filter cloth moving motor stops working. Such process may be repeated so that the emulsion is continuously filtered by the emulsion filtering machine.

However, in order to recover the copper powders carried on the filter cloth, it is usually necessary to clean the filter cloth manually so as to remove the copper powders from the filter cloth. In this way, there is a relatively heavy workload for workers, and the filter cloth cannot be reused, which leads to a high usage cost of the filter cloth in the process of manufacturing copper rods. Therefore, it is desirable to provide a filter cloth recovery device capable of effectively recovering the copper powders from the filter cloth while automatically washing the filter cloth.

BRIEF SUMMARY OF THE INVENTION

An object of the present invention is to provide a filter cloth recovery device and a copper rod continuous casting and rolling manufacturing system using the same, so as to solve technical problems in the prior art of a relatively heavy labor workload due to the recovery of copper powders, and a relatively high cost of manufacturing copper rods due to the inability to achieve efficient cleaning of the filter cloth.

An embodiment of the present invention provides a filter cloth recovery device, which includes (i) a cleaning water tank, (ii) a winding mechanism and (iii) a cleaning mechanism provided on the cleaning water tank. The winding mechanism includes:
 a winding shaft provided on the cleaning water tank and configured to wind a filter cloth after being cleaned;
 a first guiding roller configured to guide a filter cloth to be cleaned into a cloth-transmitting path within the cleaning water tank; and
 a second guiding roller provided between the first guiding roller and the winding shaft along the cloth-transmitting path so as to provide a tension force and a guiding effect to the filter cloth, with axes of the first guiding roller, the second guiding roller and the winding shaft parallel to each other, and one end of the winding shaft connected with a driving mechanism.

The cleaning mechanism is provided with a plurality of liquid spraying openings configured to spray a cleaning fluid onto the filter cloth located in the cloth-transmitting path.

The driving mechanism includes a torque motor and a coupler. The torque motor is in transmission connection with the coupler, and the coupler is in transmission connection with the winding shaft.

The cleaning water tank includes a precipitation tank, two first guiding roller supports provided at both sides of the precipitation tank and two winding shaft supports provided at the both sides of the precipitation tank;

where both ends of the first guiding roller are respectively mounted on the two first guiding roller supports via bearings, both ends of the second guiding roller are respectively mounted on inner walls at both sides of the precipitation tank via bearings, and both ends of the winding shaft are respectively mounted on the two winding shaft supports via bearings.

In practical applications, the winding shaft is provided thereon with a ratchet mechanism configured to control the winding shaft to rotate only in a cloth winding direction, and pawls of the ratchet mechanism are fixed on the winding shaft support.

Specifically, the cleaning mechanism includes:

at least one first water spraying pipe provided above the precipitation tank and located at a front face side of the filter cloth, the first water spraying pipe being provided with at least one row of liquid spraying openings arranged along a length direction thereof; and at least one second water spraying pipe provided above the precipitation tank and located at a back face side of the filter cloth, the second water spraying pipe being provided with at least one row of liquid spraying openings arranged along a length direction thereof, and the second water spraying pipe being located at a same side of the filter cloth with the second guiding roller.

Preferably, the cleaning mechanism further includes a flow divider, both the first water spraying pipe and the second water spraying pipe are communicated with the flow divider, and one water inlet is provided on the flow divider;

where one end of each of the first water spraying pipe and the second water spraying pipe close to the flow divider is provided with a valve for controlling a water flow rate.

Further, the precipitation tank is provided therein with a baffle by which the precipitation tank is divided into a copper powder precipitation portion and a cleaning fluid overflow portion, and the cleaning mechanism is provided above the precipitation tank and located at a side where the copper powder precipitation portion is. A liquid discharging pipe is provided at a lower portion of the precipitation tank and is located at a side where the cleaning fluid overflow portion is.

The filter cloth recovery device further includes:

a scraper configured to scrape off copper powders from the filter cloth, where a connecting plate is provided between the two first guiding roller supports, and the scraper is obliquely fixed onto the connecting plate via a scraper support provided on the connecting plate; and a copper powder collecting box for collecting the copper powders outside the precipitation tank, with the copper powder collecting box in correspondence with the scraper, a top end of the scraper is close to the first guiding roller and located below the first guiding roller, and a bottom end of the scraper is located above the copper powder collecting box.

The filter cloth recovery device provided by the embodiment of the present invention has the following advantages over the prior art:

when the filter cloth recovery device provided by the present invention is in use, the driving mechanism drives the winding shaft to rotate so as to wind the filter cloth, accordingly, the filter cloth carrying copper powders is transmitted through the first guiding roller and the second guiding roller to the cleaning mechanism in the cleaning water tank; by spraying the cleaning fluid to the front and back faces of the filter cloth, the cleaning mechanism can wash the filter cloth efficiently, during which the copper powders are washed out from the filter cloth into the cleaning water tank; and then the filter cloth after being washed out is wound onto the winding shaft. Since the cloth-transmitting path is provided thereon with the second guiding roller which provides a certain tension force to the filter cloth, it can be ensured that the filter cloth can be uniformly and tightly wound onto the winding shaft. Furthermore, if the copper powders precipitate and accumulate in the cleaning water tank to a certain degree, workers may take the copper powders out for recovery.

In the filter cloth recovery device provided by the embodiment of the present invention, the cleaning mechanism is provided to wash the filter cloth efficiently, and the winding shaft is provided to wind the filter cloth well, so that recovery of both the copper powders and the filter cloth are achieved, and the filter cloth after being cleaned efficiently can be reused. Therefore, compared with the prior art, the copper powders can be recovered from the filter cloth without cleaning the filter cloth manually, thereby enabling the workload for workers to clean the filter cloth for recovering the copper powders to be reduced, while greatly reducing the usage cost of the filter cloth in the process of manufacturing copper rods.

An embodiment of the present invention further provides a copper rod continuous casting and rolling manufacturing system, which includes an emulsion filtering machine and the filter cloth recovery device described above.

Preferably, the copper rod continuous casting and rolling manufacturing system further includes a filter cloth moving motor, an operation box, a controller and a float switch, the controller being mounted in the operation box and configured to control the driving mechanism and the filter cloth moving motor to simultaneously start or stop, and the float switch being configured for on-off control of the moving motor through the controller. The operation box is mounted on the filter cloth recovering device, and the filter cloth moving motor and the float switch are provided on the emulsion filtering machine.

The copper rod continuous casting and rolling manufacturing system has the same advantages as the above filter cloth recovery device over the prior art, which will not be repeated herein.

BRIEF DESCRIPTION OF THE DRAWINGS

In order to more clearly illustrate technical solutions in particular embodiments of the present invention or in the prior art, figures which are needed for description of the embodiments or the prior art will be introduced briefly below. It is to be noted, however, that the drawings illustrate only selected embodiments of the inventions and are therefore not to be considered limiting of scope, for the inventions may admit to other equally effective embodiments and applications.

FIG. 4 is a top view of the filter cloth recovery device of FIG. 1; and.

DETAILED DESCRIPTION OF CERTAIN EMBODIMENTS

Reference signs: 1—winding mechanism; 11—first guiding roller; 12—second guiding roller; 13—winding shaft; 131—ratchet mechanism; 132—torque motor; 133—coupler; 2—cleaning mechanism; 21—first water spraying pipe; 211—valve; 22—second water spraying pipe; 23—flow divider; 24—pump; 3—precipitation tank; 31—first guiding roller support; 311—connecting plate; 32—winding shaft support; 321—operation box; 33—scraper support; 331—scraper; 34—liquid discharging pipe; 35—baffle; 4—copper powder collecting box; 5—filter cloth.

The technical solutions of the present invention will be described below, in conjunction with the figures of the present invention. Based on the embodiments of the present invention, all of the other embodiments obtained by a person ordinarily skilled in the art, without any inventive effort, would fall within the scope of protection of the present invention.

In the description of the present invention, it should be noted that orientational or positional relationships indicated by terms, such as "center", "upper", "lower", "left", "right", "vertical", "horizontal", "inner", "outer", "front" and "back", are based on orientational or positional relationships as shown in the figures, merely for facilitating describing the present invention and simplifying the description, rather than indicating or suggesting that related devices or elements have to be in a specific orientation or configured and operated in a specific orientation, therefore, they should not be construed as limiting the present invention. Besides, terms "first", "second" and "third" are merely for descriptive purpose, and should not be understood as indicating or suggesting relative importance.

In the description of the present invention, it should be indicated that unless otherwise explicitly specified or defined, terms "installation", "link" and "connection" should be understood in a broad sense. For example, it may be a fixed connection, a detachable connection, or an integrated connection; it may be a mechanical connection, or an electrical connection; it may be a direct connection, or an indirect connection through an intermediate medium; and it may be an inner communication between two elements. For a person ordinarily skilled in the art, the specific meanings of the above mentioned terms in the present invention can be understood under specific circumstances.

As shown in FIG. 1 to FIG. 5, a filter cloth recovery device 100 provided by the present embodiment includes a cleaning water tank 6, a winding mechanism 1 and a cleaning mechanism 2 provided on the cleaning water tank 6. The winding mechanism 1 includes: a winding shaft 13 provided on the cleaning water tank 6 and configured to wind a filter cloth 5 after being cleaned; a first guiding roller 11 configured to guide the filter cloth 5 to be cleaned into a cloth-transmitting path within the cleaning water tank 6; and a second guiding roller 12 provided between the first guiding roller 11 and the winding shaft 13 along the cloth-transmitting path for providing a tension force and a guiding effect to the filter cloth 5 above the cleaning water tank 6. Axes of the first guiding roller 11, the second guiding roller 12 and the winding shaft 13 are parallel to each other, and one end of the winding shaft 13 is connected with a driving mechanism.

The cleaning mechanism 2 is provided with a plurality of liquid spraying openings configured to spray a cleaning fluid to the filter cloth 5 located in the cloth-transmitting path.

The filter cloth recovery device provided by the present embodiment has the following advantages over the prior art:

When the filter cloth recovery device provided by the present embodiment is in use, the driving mechanism drives the winding shaft 13 to rotate so as to wind the filter cloth 5, accordingly, the filter cloth 5 carrying copper powders is transmitted through the first guiding roller 11 and the second guiding roller 12 to the cleaning mechanism 2 in the cleaning water tank; by spraying the cleaning fluid to the front and back faces of the filter cloth 5, the cleaning mechanism 2 can wash the filter cloth 5 efficiently, during which the copper powders are washed out from the filter cloth 5 into the cleaning water tank; and then the filter cloth 5 after being washed out is wound onto the winding shaft 13. Since the cloth-transmitting path is provided thereon with the second guiding roller 12 which provides a certain tension force to the filter cloth 5, it can be ensured that the filter cloth 5 can be uniformly and tightly wound onto the winding shaft 13. Furthermore, if the copper powders precipitate and accumulate in the cleaning water tank to a certain degree, workers may recover the copper powders.

In the filter cloth recovery device provided by the present embodiment, the cleaning mechanism 2 is provided to wash the filter cloth 5 efficiently, and the winding shaft 13 is provided to wind the filter cloth 5 well, so that recovery of both the copper powders and the filter cloth 5 are achieved, and the filter cloth 5 after being cleaned efficiently can be reused. Therefore, compared with the prior art, the copper powders can be recovered from the filter cloth 5 without cleaning the filter cloth 5 manually, thereby enabling the workload for workers to clean the filter cloth 5 for recovering the copper powders to be reduced, while reducing the usage cost of the filter cloth 5 in the process of manufacturing copper rods.

Figure 4:
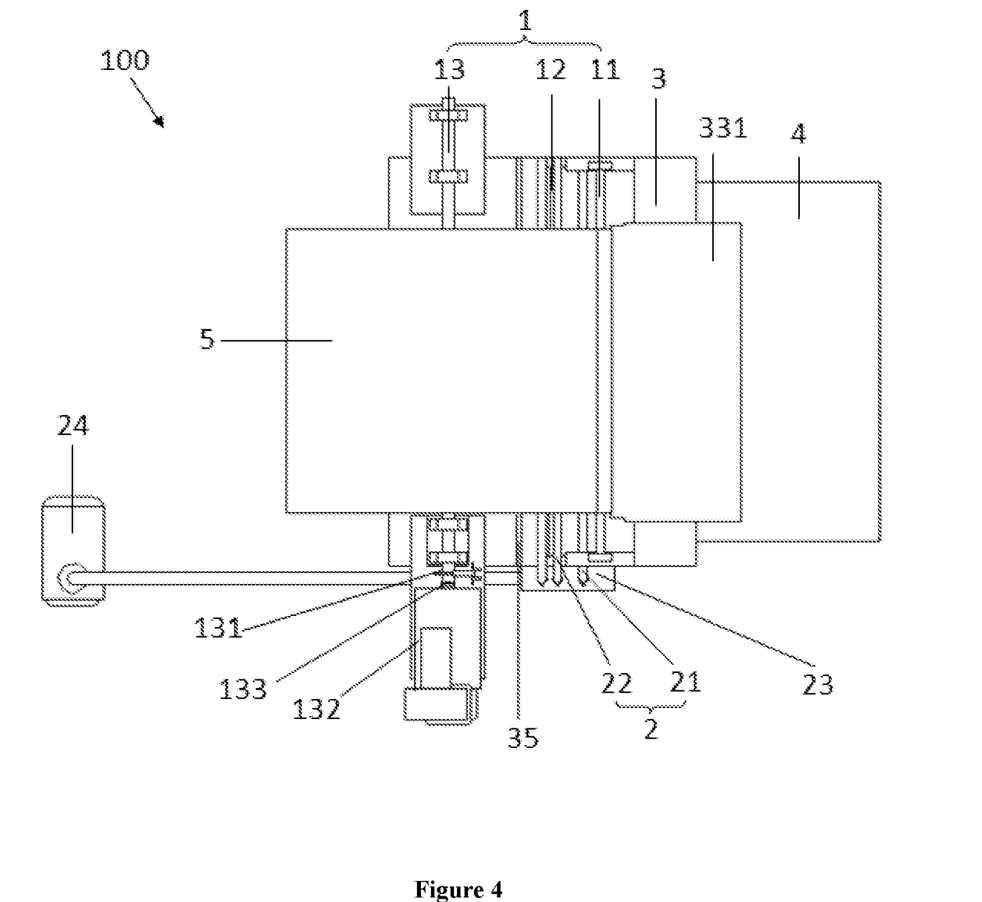
Figure 5:
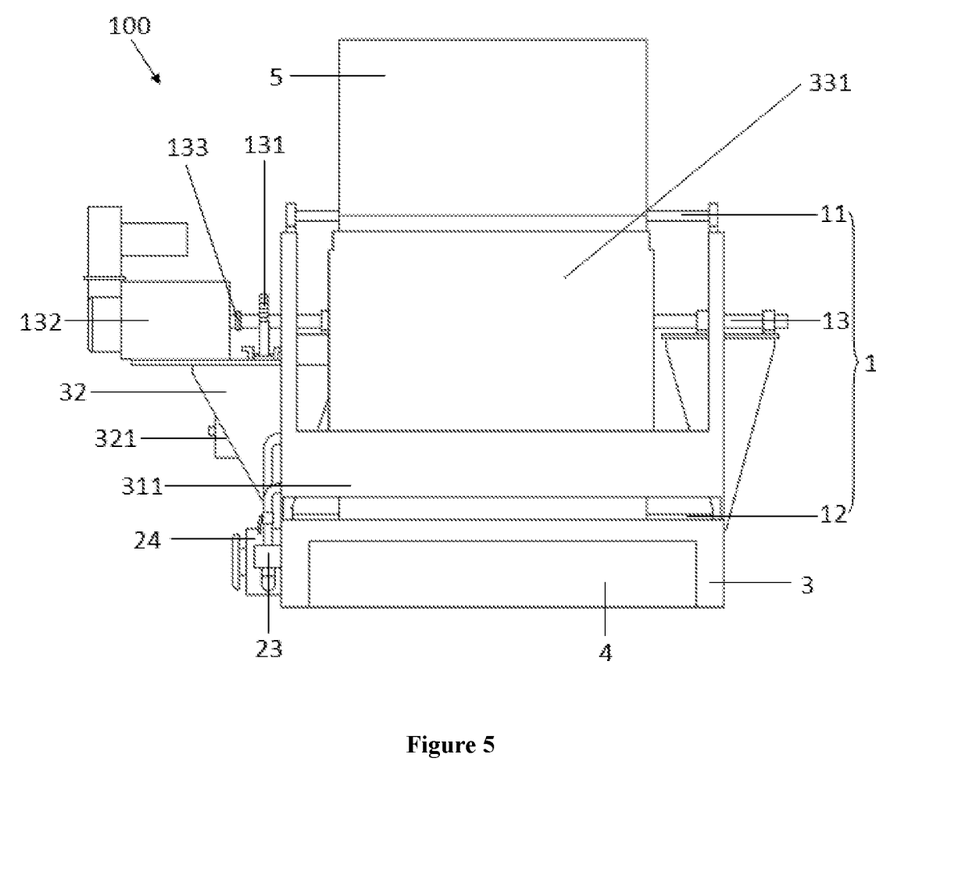
FIG. 5 is a front view of the filter cloth recovery device of FIG. 1.

Here, in order to enable the winding shaft 13 to rotate well under the driving of the driving mechanism, so as to wind the filter cloth 5, in the filter cloth recovery device provided by the present embodiment, the driving mechanism may include a torque motor 132 and a coupler 133, as shown in FIG. 4 and FIG. 5. The torque motor 132 is in transmission connection with the coupler 133, and the coupler 133 is in transmission connection with the winding shaft 13.

With a transmission connection between a driving shaft of the torque motor 132 and the coupler 133, and a transmission connection between the coupler 133 and one end of the winding shaft 13, it can be ensured that the torque motor 132 can drive the winding shaft 13 to rotate well, so that the winding shaft 13 can wind the filter cloth 5 uniformly.

Figure 1:
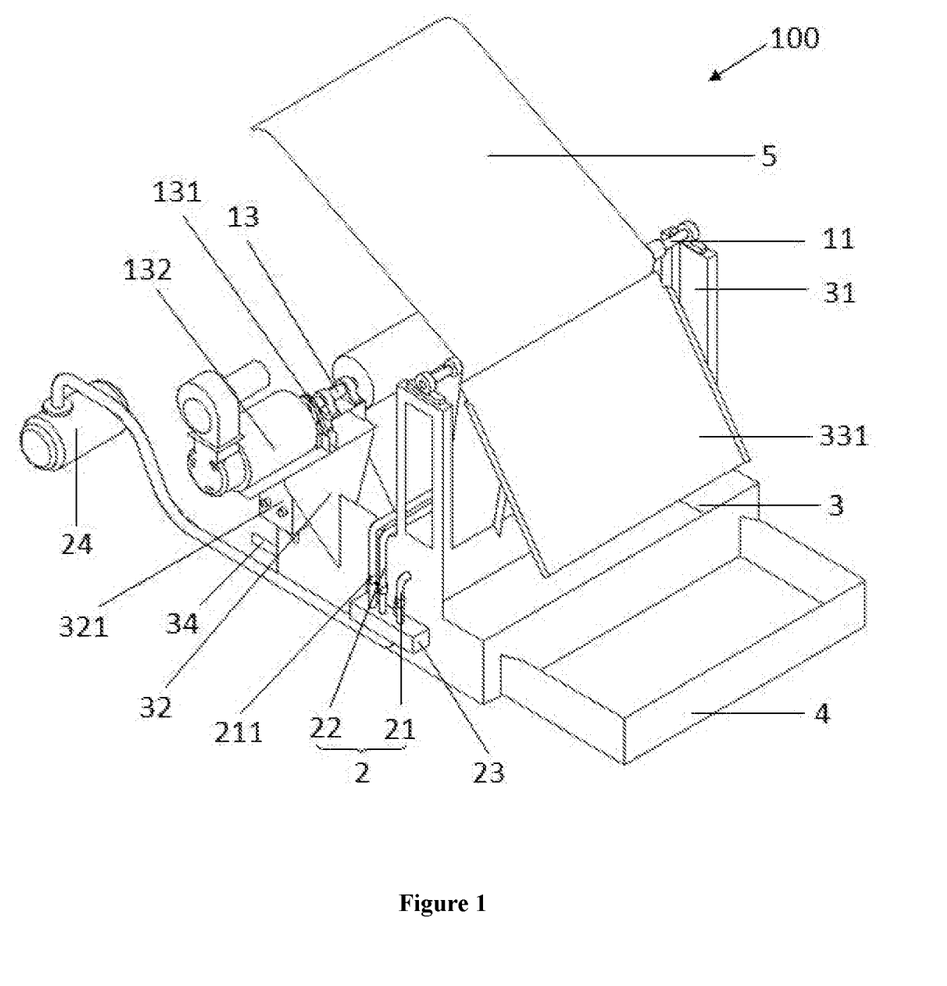
FIG. 1 is a structural schematic view of a filter cloth recovery device provided by an embodiment of the present invention.

Specifically, in order to ensure that that first guiding roller 11 can well guide the filter cloth 5 to be cleaned into the cloth-transmitting path within the cleaning water tank 6, and that the second guiding roller 12 can provide a sufficient tension force to the filter cloth 5 so that the filter cloth 5 can be uniformly and tightly wound onto the winding shaft 13, in the filter cloth recovery device 100 provided by the present embodiment, the cleaning water tank 6 includes a precipitation tank 3, two first guiding roller supports 31 provided at both sides of the precipitation tank 3, and two winding shaft supports 32 provided at the both sides of the precipitation tank 3, as shown in FIG. 1, FIG. 4 and FIG. 5. Both ends of the first guiding roller 11 are respectively mounted on the two first guiding roller supports 31 via bearings, both ends of the second guiding roller 12 are respectively mounted on inner walls at both sides of the precipitation tank 3 via bearings, and both ends of the winding shaft 13 are respectively mounted on the two winding shaft supports 32 via bearings.

By mounting both ends of the first guiding roller 11, the second guiding roller 12 and the winding shaft 13 onto bearing seats located at corresponding positions of the cleaning water tank 6 via bearings, respectively, it can be ensured that the winding shaft 13 rotates smoothly under the driving of the driving mechanism, and the filter cloth 5 can be well wound. The first guiding roller 11 and the second guiding roller 12 may be driven by the filter cloth 5 to rotate in a same direction as the winding shaft 13, so as to provide certain guiding and tensioning effects to the filter cloth 5, thereby enabling the winding shaft 13 to uniformly and tightly wind the filter cloth 5, so that the filter cloth 5 can be reused in the process of manufacturing corner rods.

Preferably, in order to ensure that the winding shaft 13 is prevented from rotating in a direction opposite to a cloth winding direction as being pulled under the gravity of the filter cloth 5 when the torque motor 132 stops the winding, and thus has no influence on the winding uniformity of the filter cloth 5, in the filter cloth recovery device provided by the present embodiment, a ratchet mechanism 131 is provided on the winding shaft 13, as shown in FIG. 1, FIG. 4 and FIG. 5. This ratchet mechanism 131 is configured to control the winding shaft 13 to rotate only in the cloth winding direction. Pawls of the ratchet mechanism 131 are fixed on the winding shaft support 32.

As the ratchet mechanism 131 has its ratchet fixed onto the winding shaft 13 and its pawls fixed onto the winding shaft support 32, it is ensured that the ratchet mechanism 131 can effectively prevent the winding shaft 13 from counter-rotation so as to avoid non-uniform winding of the filter cloth 5 which would be caused by the counter-rotation of the winding shaft 13, when the torque motor 132 stops the winding.

Here, in order to enable the filter cloth 5, before being wound by the winding shaft 13, to be washed out, so that the filter cloth 5 after being wound can be reused in the process of manufacturing copper rods to save the manufacturing cost, in the filter cloth recovery device provided by the present embodiment, as shown in FIG. 1, FIG. 4 and FIG. 5, the cleaning mechanism 2 may include:

at least one first water spraying pipe 21 provided above the precipitation tank 3 and located at a front face side of the filter cloth 5, the first water spraying pipe 21 being provided with at least one row of liquid spraying openings arranged along a length direction thereof; and at least one second water spraying pipe 22 provided above the precipitation tank 3 and located at a back face side of the filter cloth 5, the second water spraying pipe 22 being provided with at least one row of liquid spraying openings arranged along a length direction thereof, and the second water spraying pipe 22 being located at the same side of the filter cloth 5 with the second guiding roller 12.

On the front face of the filter cloth 5 which has been used in an emulsion filtering machine, copper powders are accumulated. The filter cloth 5 carrying the copper powders is transmitted by a filter cloth moving roller onto the first guiding roller 11, and is in turn transmitted by the first guiding roller 11 under force provided by the winding shaft 13 to the second guiding roller 12, and is then transmitted onto the winding shaft 13 by passing through a lower end of the second guiding roller 12, so as to be wound. With the transmitting and tensioning effects exerted by the torque motor 132, the winding shaft 13, the first guiding roller 11 and the second guiding roller 12, the front face of the filter cloth 5 is turned from facing up to facing down, so that the front face of the filter cloth 5 carrying the copper powders faces the precipitation tank 3 when being transmitted to the cleaning mechanism 2. In this way, it is ensured that the copper powders can be efficiently washed out from the front face of the filter cloth 5 into the precipitation tank 3 when the cleaning mechanism 2 washes the filter cloth 5, so that the copper powders on the filter cloth 5 are washed down more thoroughly.

In the present embodiment, at least one first water spraying pipe 21 is provided above the precipitation tank 3 and located at the front face side of the filter cloth 5, and at least one second water spraying pipe 22 is provided above the precipitation tank 3 and located at the back face side of the filter cloth 5, with each of the first water spraying pipe 21 and the second water spraying pipe 22 provided with at least one row of liquid spraying openings arranged along the length direction thereof, and all of the liquid spraying openings facing towards the filter cloth 5. Each of the first water spraying pipe 21 and the second water spraying pipe 22 is communicated with a pump 24. A cleaning fluid is delivered by the pump 24 to the first water spraying pipe 21 and the second water spraying pipe 22, and sprayed onto the filter cloth 5 through the liquid spraying openings. The cleaning fluid may be water or an emulsion. Since providing lubrication, the emulsion is better in washing out the copper powders, so that the copper powders carried on the front face of the filter cloth 5 are washed off thoroughly and flow into the precipitation tank 3 along with the cleaning fluid. Once the copper powders, after precipitation and accumulation, reach a certain height in the precipitation tank 3, they would be recovered by workers.

In order to ensure that the usage cost can be saved while the filter cloth recovery device can operate normally, and meanwhile, the impulsion and the flow rate, at which the cleaning fluid is sprayed onto the filter cloth 5 through the liquid spraying openings of the first water spraying pipe 21 and the second water spraying pipe 22, can be well controlled so as to better wash off the copper powders from the filter cloth 5, in the filter cloth recovery device provided by the present embodiment, the cleaning mechanism 2 further includes a flow divider 23, as shown in FIG. 1. Both the first water spraying pipe 21 and the second water spraying pipe 22 are communicated with the flow divider 23, and one water inlet is provided on the flow divider 23. One end of each of the first water spraying pipe 21 and the second water spraying pipe 22 close to the flow divider 23 is provided with a valve 211 for controlling the water flow rate.

A pipeline communicated with the pump 24 is connected at the water inlet of the flow divider 23. In this way, the one pump 24 is capable of supplying the cleaning fluid to a plurality of first water spraying pipes 21 and a plurality of second water spraying pipes 22 simultaneously, which avoids a situation that each of the first water spraying pipes 21 and the second water spraying pipes 22 requires to be connected with one pump 24 so as to be supplied with the cleaning fluid, thereby saving the usage cost.

The impulsion and the flow rate, at which the first water spraying pipe 21 and the second water spraying pipe 22 spray the cleaning fluid, may be controlled by controlling the opening of the valve 211. In this way, the impulsive force exerted by the cleaning fluid to the copper powders on the filter cloth 5 may be adjusted to be relatively strong so as to ensure that all the copper powders on the filter cloth 5 can be washed out, without causing damage to the filter cloth 5 itself.

Furthermore, in order to make it easy to manually recover the copper powders washed off from the filter cloth 5, in the filter cloth recovery device provided by the present embodiment, a baffle 35 is provided in the precipitation tank 3, as shown in FIG. 1 and FIG. 4. The precipitation tank 3 is divided by the baffle 35 into a copper powder precipitation portion and a cleaning fluid overflow portion. The cleaning mechanism 2 is provided above the precipitation tank 3 and located at a side where the copper powder precipitation portion is. A liquid discharging pipe 34 is provided at a lower portion of the precipitation tank 3 and located at a side where the cleaning fluid overflow portion is.

As the baffle 35 is provided in the precipitation tank 3 in such a manner that the height of the baffle 35 is lower than the height of an outer wall of the precipitation tank 3, and the cleaning mechanism 2 is provided above the precipitation tank 3 and located at a side where the copper powder precipitation portion is, it can be ensured that all of the copper powders on the filter cloth 5 are washed off into the copper powder precipitation portion of the precipitation tank 3. As the cleaning fluid accumulates in the copper powder precipitation portion, it may flow over the baffle 35 into the cleaning fluid overflow portion once the liquid level rises to the height of the baffle 35. Since the liquid discharging pipe 34 is provided at the lower portion of the precipitation tank 3 and located at the side where the cleaning fluid overflow portion is, the cleaning fluid which has flown into the cleaning fluid overflow portion may be discharged into a specific collecting tank through the liquid discharging pipe 34. The cleaning fluid collected by the collecting tank has no copper powder, and can therefore be reused as a cleaning fluid. The copper powders precipitate and accumulate in the copper powder precipitation portion, and can be manually recovered when such accumulation reaches a certain height.

Figure 2:
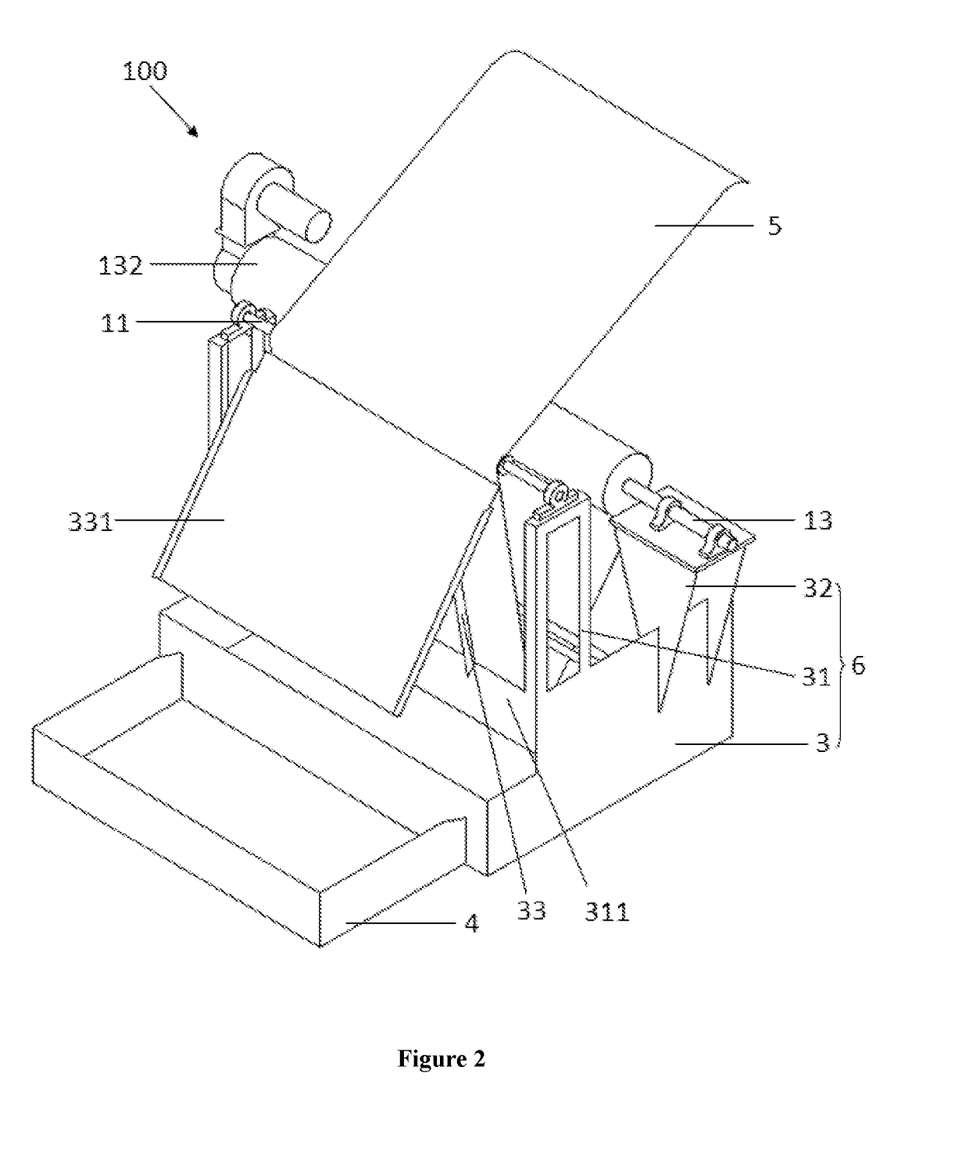
FIG. 2 is a structural schematic view of the filter cloth recovery device of FIG. 1, shown from an opposite angle.
Figure 3:
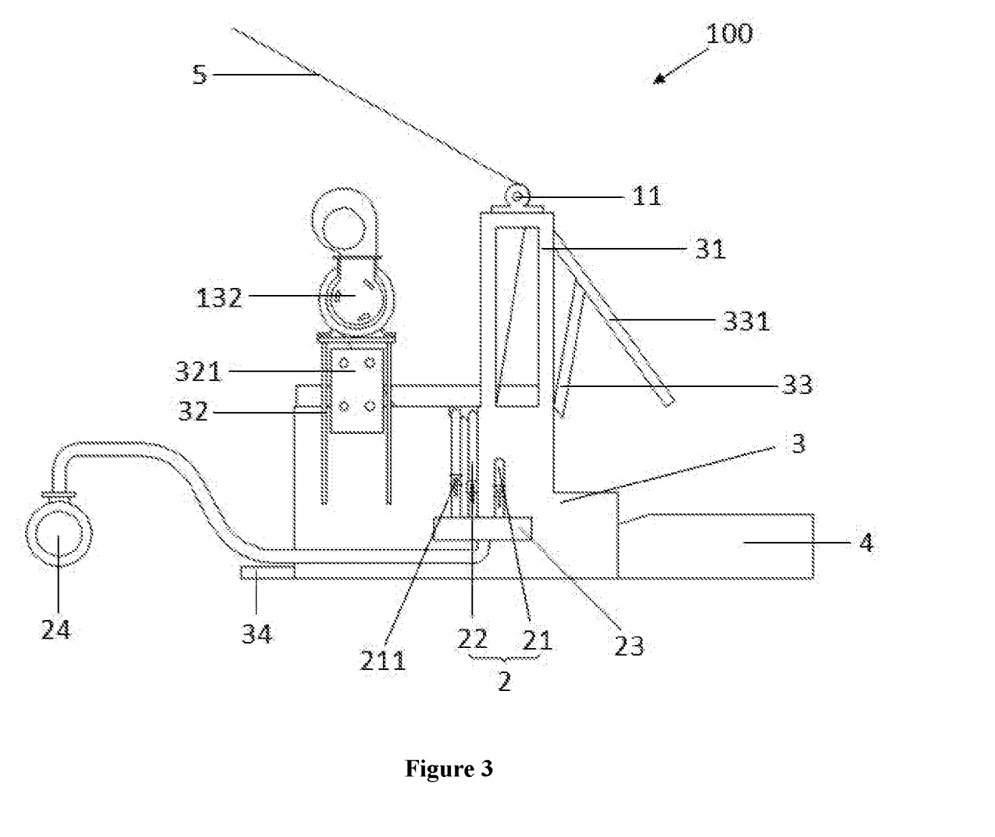
FIG. 3 is a side view of the filter cloth recovery device of FIG. 1.

In practical manufacturing and fabrication, in order to further ensure that the cleaning mechanism 2 can wash out the copper powders from the surface of the filter cloth 5 within a short period of time during which the filter cloth passes through the cleaning mechanism 2 before being wound, so as to ensure that the filter cloth 5 after being cleaned can be reused in the process of manufacturing copper rods, in the filter cloth recovery device provided by the present embodiment, the filter cloth recovery device may further include a scraper 331 configured to scrape off the copper powders from the filter cloth 5, as shown in FIG. 1, FIG. 2 and FIG. 5. A connecting plate 311 is provided between the two first guiding roller supports 31, and the scraper 331 is obliquely fixed onto the connecting plate 311 via a scraper support 33 provided on the connecting plate 311. A copper powder collecting box 4 for collecting the copper powders is provided outside the precipitation tank 3 with the copper powder collecting box in correspondence with the scraper 331. A top end of the scraper 331 is close to the first guiding roller 11 and located below the first guiding roller 11, and a bottom end of the scraper 331 is located above the copper powder collecting box 4.

In the process that the emulsion filtering machine filters the emulsion, the copper powders accumulate on the front face of the filter cloth 5, and the filter cloth 5 is transmitted and tensioned by the torque motor 132, the winding shaft 13, the first guiding roller 11 and the second guiding roller 12, during which the front face of the filter cloth 5 is turned from facing up to facing down. Since the scraper 331 is obliquely provided on the connecting plate 311, in the process that the filter cloth 5 is transmitted from the first guiding roller 11 to the second guiding roller 12, a part of the copper powders on the front face of the filter cloth 5 can be scraped off due to a contact between the scraper 331 and the front face of the filter cloth 5, and such copper powders flow into the copper powder collecting box 4 along an oblique surface of the scraper 331. Since a part of the copper powders has been scraped off before the filter cloth 5 is cleaned by the cleaning mechanism 2, it becomes easier for the cleaning mechanism 2 to clean the filter cloth 5, and it is ensured that the cleaning mechanism 2 can wash out all the copper powders from the surface of the filter cloth 5 within a short period of time during which the filter cloth is transmitted.

Further, in order to save the usage cost of the filter cloth 5 in the process of manufacturing copper rods with a copper rod continuous casting and rolling manufacturing system, and to reduce the workload for workers to recover copper powders, the copper rod continuous casting and rolling manufacturing system may include an emulsion filtering machine and the filter cloth recovery device 100 provided in the above embodiments. Since being provided with the winding mechanism 1 and the cleaning mechanism 2, such filter cloth recovery device 100 can efficiently wash the filter cloth 5, and well wind the filter cloth 5 onto the winding shaft 13 after being washed. Since the cloth-transmitting path is provided thereon with the first guiding roller 11 and the second guiding roller 12 which provides guiding, transmitting and tensing effects to the filter cloth 5, it can be ensured that the filter cloth 5 can be uniformly and tightly wound onto the winding shaft 13. When the copper powders accumulate in the cleaning water tank 6 to a certain degree, workers can take them out for recovery. Therefore, the copper powders on the filter cloth 5 may be recovered without manually cleaning the filter cloth 5, thereby enabling the workload for workers to clean the filter cloth 5 for recovering the copper powders to be reduced, while greatly reducing the usage cost of the filter cloth 5 in the process of manufacturing copper rods.

Furthermore, in order to enable the driving mechanism for driving the winding shaft 13 to rotate and a filter cloth moving motor for driving the filter cloth moving roller to rotate to simultaneously start or stop, so as to avoid damage to the torque motor 132 of the driving mechanism which would otherwise be caused by a long-term stall of the torque motor when the filter cloth moving motor stops working, as shown in FIG. 1, the copper rod continuous casting and rolling manufacturing system further includes a filter cloth moving motor, an operation box 321, a controller and a float switch, the controller being mounted in the operation box 321 and configured to control the driving mechanism and the filter cloth moving motor to simultaneously start or stop, and the float switch configured for on-off control of the controller. The operation box 321 is mounted on the filter cloth recovering device, while the filter cloth moving motor and the float switch are provided on the emulsion filtering machine.

The controller described above may be a contactor. If a contactor is used to control the filter cloth moving motor, an auxiliary contact of this contactor would be used to control the torque motor 132, so that the torque motor 132 is also started up at the same time when the filter cloth moving motor is started up, and the torque motor 132 also stops at the same time when the filter cloth moving motor stops, so as to realize production automation. In order to make it easy to manually replace the winding shaft 13 having a full roll of the filter cloth 5 upon complete winding, the operation box 321 may be provided on the filter cloth recovery device, where the operation box 321 is connected with both an auxiliary contact of the contactor and the pump 24, and the auxiliary contact of the contactor is, in turn, connected with the torque motor 132, so that the pump 24 and the torque motor 132 may be directly started or stopped by controlling the operation box 321.

When the filter cloth recovery device is to be used, firstly, a switch for controlling the operation of the pump 24 and a switch for controlling the operation of the torque motor 132 which are on the operation box 321 are manually switched on. If the copper powders on the surface of the filter cloth 5 of the emulsion filtering machine accumulate to such a degree that causes the filter cloth 5 to be blocked up, the speed at which the emulsion passes through the filter cloth 5 is slowed down, and in this case, the liquid level above the filter cloth 5 rises. Once the liquid level above the filter cloth 5 rises to a certain degree, the float switch provided above the filter cloth 5 would float upward so that the contactor connected with the float switch and the filter cloth moving motor is picked up, and then the filter cloth moving motor is started up to drive the filter cloth moving roller to rotate. At the same time, the auxiliary contact of the contactor is also picked up, and then the torque motor 132 is started up, and the winding shaft 13 starts to rotate for winding. The filter cloth 5 carrying the copper powders is transmitted from the filter cloth moving roller through the first guiding roller 11 and the second guiding roller 12 to the cleaning mechanism 2 of the filter cloth recovery device. The cleaning mechanism 2 can effectively wash the filter cloth 5, and the filter cloth 5 after being washed out is wound onto the winding shaft 13 along the cloth-transmitting path, until the filter cloth 5 overlying the emulsion filtering machine can make the emulsion filtered smoothly. Then, the liquid surface above the filter cloth 5 decreases and the float switch above the filter cloth 5 falls off accordingly, the contactor is thus disconnected. In this case, the filter cloth moving motor stops working, and the filter cloth moving roller driven by the filter cloth moving motor therefore stops transmitting the filter cloth 5; and meanwhile, the auxiliary contact of the contactor is also disconnected, thus the torque motor 132 also stops working, and the winding shaft 13 stops the winding. Such process may be repeated so that the torque motor 132 and the filter cloth moving motor operate simultaneously, so as to avoid damage to the torque motor 132 which would otherwise be caused by a long-term stall of the torque motor 132 due to the stopping of the transmission of the filter cloth 5 by the filter cloth moving roller when the filter cloth moving motor stops working.

At last, it is to be explained that the above embodiments are merely to illustrate the technical solutions of the present invention, rather than limiting the invention. While detailed description is made to the present invention with reference to the above-mentioned embodiments, a person ordinarily skilled in the art should understand that the technical solutions of the above-mentioned embodiments still can be modified, or equivalent substitutions can be made to part or all of the technical features therein; and these modifications or substitutions do not cause the essence of corresponding technical solutions to depart from the scope of the technical solutions of the embodiments of the present invention.

The invention claimed is:

1. A filter cloth recovery device, comprising:
   a cleaning water tank; a winding mechanism; and a cleaning mechanism provided on the cleaning water tank;
   wherein the winding mechanism comprises:
      a winding shaft provided on the cleaning water tank and configured to wind a filter cloth sprayed thereon with a cleaning fluid;
      a first guiding roller configured to guide a filter cloth to be cleaned into a cloth-transmitting path within the cleaning water tank; and
      a second guiding roller provided between the first guiding roller and the winding shaft along the cloth-transmitting path configured to provide a tension force and a guiding effect to the filter cloth during cleaning and winding,
   axes of the first guiding roller, the second guiding roller and the winding shaft are parallel to each other, and one end of the winding shaft connected with a rotational driving mechanism to effectuate the winding; and the cleaning mechanism is provided with a plurality of liquid spraying openings configured to spray the cleaning fluid onto the filter cloth during the winding,
   wherein the rotational driving mechanism comprises a torque motor and a coupler, wherein the torque motor is in transmission connection with the coupler, and the coupler is in transmission connection with the winding shaft to impart a rotational force to the winding shaft.

2. The filter cloth recovery device according to claim 1, wherein the cleaning water tank comprises: a precipitation tank, two first guiding roller supports provided at opposing sides of the precipitation tank, and two winding shaft supports also provided at the opposing sides of the precipitation tank;
   wherein opposing ends of the first guiding roller are respectively mounted on the two first guiding roller supports via bearings, opposing ends of the second guiding roller are respectively mounted on inner walls at the opposing sides of the precipitation tank via bearings, and opposing ends of the winding shaft are respectively mounted on the two winding shaft supports via bearings.

3. The filter cloth recovery device according to claim 2, wherein the winding shaft is provided thereon with a ratchet mechanism configured to control the winding shaft to rotate only in a cloth winding direction, and pawls of the ratchet mechanism are fixed on the winding shaft support.

4. The filter cloth recovery device according to claim 2, wherein the cleaning mechanism further comprises:
   at least one first water spraying pipe provided above the precipitation tank and located at a front face side of the filter cloth, the first water spraying pipe being provided with at least one row of liquid spraying openings arranged along a length direction thereof; and
   at least one second water spraying pipe provided above the precipitation tank and located at a back face side of the filter cloth, the second water spraying pipe being provided with at least one row of liquid spraying openings arranged along a length direction thereof, and the second water spraying pipe being located at a same side of the filter cloth with the second guiding roller.

5. The filter cloth recovery device according to claim 4, wherein the cleaning mechanism further comprises a flow divider, both the at least one first water spraying pipe and the at least one second water spraying pipe are communicated with the flow divider, and a water inlet is provided on the flow divider; and one end of each of the at least one first water spraying pipe and the at least one second water spraying pipe is provided with a valve for controlling a water flow rate.

6. The filter cloth recovery device according to claim 2, wherein the precipitation tank is provided therein with a baffle by which the precipitation tank is divided into a copper powder precipitation portion and a cleaning fluid overflow portion; the cleaning mechanism resides above the precipitation tank and is located at a side where the copper powder precipitation portion is; and a liquid discharging pipe is provided at a lower portion of the precipitation tank and is located at a side where the cleaning fluid overflow portion is.

7. The filter cloth recovery device according to claim 2, further comprising:
   a scraper configured to scrape off copper powders on the filter cloth during the winding;
   a connecting plate provided between the two first guiding roller supports, where the scraper is obliquely affixed to the connecting plate via a scraper support provided on the connecting plate; and
   a copper powder collecting box configured to receive the copper powders, where the collecting box is provided outside the precipitation tank with the copper powder collecting box in correspondence to the scraper, a top end of the scraper is adjacent the first guiding roller and located below the first guiding roller, and a bottom end of the scraper is located above the copper powder collecting box.

8. The filter cloth recovery device according to claim 3, further comprising:
   a scraper configured to scrape off copper powders on the filter cloth during the winding;
   a connecting plate provided between the two first guiding roller supports, where the scraper is obliquely affixed to the connecting plate via a scraper support provided on the connecting plate; and
   a copper powder collecting box configured to receive the copper powders, where the collecting box is provided outside the precipitation tank with the copper powder collecting box in correspondence to the scraper, a top end of the scraper is adjacent the first guiding roller and located below the first guiding roller, and a bottom end of the scraper is located above the copper powder collecting box.

9. The filter cloth recovery device according to claim 4, further comprising:
   a scraper configured to scrape off copper powders on the filter cloth during the winding;
   a connecting plate provided between the two first guiding roller supports, where the scraper is obliquely affixed to the connecting plate via a scraper support provided on the connecting plate; and
   a copper powder collecting box configured to receive the copper powders, where the collecting box is provided outside the precipitation tank with the copper powder collecting box in correspondence to the scraper, a top end of the scraper is adjacent the first guiding roller and located below the first guiding roller, and a bottom end of the scraper is located above the copper powder collecting box.

10. The filter cloth recovery device according to claim 5, further comprising:
    a scraper configured to scrape off copper powders on the filter cloth during the winding;
    a connecting plate provided between the two first guiding roller supports, where the scraper is obliquely affixed to the connecting plate via a scraper support provided on the connecting plate; and
    a copper powder collecting box configured to receive the copper powders, where the collecting box is provided outside the precipitation tank with the copper powder collecting box in correspondence to the scraper, a top end of the scraper is adjacent the first guiding roller and located below the first guiding roller, and a bottom end of the scraper is located above the copper powder collecting box.

11. The filter cloth recovery device according to claim 6, further comprising:
    a scraper configured to scrape off copper powders on the filter cloth during the winding;
    a connecting plate provided between the two first guiding roller supports, where the scraper is obliquely affixed to the connecting plate via a scraper support provided on the connecting plate; and
    a copper powder collecting box configured to receive the copper powders, where the collecting box is provided outside the precipitation tank with the copper powder collecting box in correspondence to the scraper, a top end of the scraper is adjacent the first guiding roller and located below the first guiding roller, and a bottom end of the scraper is located above the copper powder collecting box.

12. A copper rod continuous casting and rolling manufacturing system, comprising an emulsion filtering machine and the filter cloth recovery device according to claim 1, wherein the emulsion filtering machine comprises a filter cloth configured for filtering an emulsion.

13. The copper rod continuous casting and rolling manufacturing system according to claim 12, further comprising:
    a filter cloth moving motor configured to unwind a source roll of filter cloth;
    an operation box mounted on the filter cloth recovery device;
    a controller in electrical communication with the rotational driving mechanism, the controller being mounted in the operation box and configured to control the rotational driving mechanism and the filter cloth moving motor to simultaneously start or stop, and
    a float switch provided on the emulsion filtering machine and configured for on-off control of the controller through rising or falling of fluid level above the filter cloth in the emulsion filtering machine,
    wherein the float switch activates the rotational driving mechanism and the filter cloth moving motor simultaneously when the fluid level rises to a designated level in the emulsion filtering machine to move the filter cloth through the cloth-transmitting path, and to deactivate the rotational driving mechanism and the filter cloth moving motor simultaneously when the fluid level falls back to a designated level in the emulsion filtering machine.

14. The copper rod continuous casting and rolling manufacturing system according to claim 13, further comprising:
    a scraper configured to scrape off copper powders on the filter cloth during the winding;
    a connecting plate provided between the two first guiding roller supports, where the scraper is obliquely affixed to the connecting plate via a scraper support provided on the connecting plate; and
    a copper powder collecting box configured to receive the copper powders, where the collecting box is provided outside the precipitation tank with the copper powder collecting box in correspondence to the scraper, a top end of the scraper is adjacent the first guiding roller and located below the first guiding roller, and a bottom end of the scraper is located above the copper powder collecting box.

* * * * *